(12) United States Patent
Kawanishi et al.

(10) Patent No.: US 10,699,106 B2
(45) Date of Patent: Jun. 30, 2020

(54) DIRECTION DISCRIMINATION DEVICE AND DIRECTION DISCRIMINATION METHOD

(71) Applicants: Toyota Jidosha Kabushiki Kaisha, Toyota-shi, Aichi-ken (JP); National University Corporation Nagoya University, Nagoya-shi, Aichi-ken (JP)

(72) Inventors: Yasutomo Kawanishi, Nagoya (JP); Fumito Shimmura, Nagoya (JP); Daisuke Deguchi, Nagoya (JP); Ichiro Ide, Nagoya (JP); Hiroshi Murase, Nagoya (JP)

(73) Assignees: Toyota Jidosha Kabushiki Kaisha, Toyota-shi, Aichi-ken (JP); National University Corporation Nagoya University, Nagoya-shi, Aichi-ken (JP)

(*) Notice: Subject to any disclaimer, the term of this patent is extended or adjusted under 35 U.S.C. 154(b) by 283 days.

(21) Appl. No.: 15/665,725

(22) Filed: Aug. 1, 2017

(65) Prior Publication Data
US 2018/0039826 A1 Feb. 8, 2018

(30) Foreign Application Priority Data
Aug. 2, 2016 (JP) .................. 2016-152338

(51) Int. Cl.
| G06K 9/00 | (2006.01) |
| G06K 9/62 | (2006.01) |
| G08G 1/16 | (2006.01) |

(52) U.S. Cl.
CPC ..... *G06K 9/00369* (2013.01); *G06K 9/00201* (2013.01); *G06K 9/00805* (2013.01);
(Continued)

(58) Field of Classification Search
CPC .............. G06K 9/00369; G06K 9/627; G06K 9/00201; G06K 9/00805; G08G 1/166; G08G 1/165
See application file for complete search history.

(56) References Cited

U.S. PATENT DOCUMENTS

| 2003/0200188 A1 | 10/2003 | Moghaddam | |
| 2015/0169947 A1* | 6/2015 | Kawaguchi | G01S 5/163 382/103 |

FOREIGN PATENT DOCUMENTS

| JP | 2004-127238 A | 4/2004 |
| JP | 2015-079339 A | 4/2015 |

OTHER PUBLICATIONS

Hiroaki Shimizu et al. "Direction Estimation of Pedestrian from Multiple Still Images", 2004 IEEE Intelligent Vehicles Symposium, IEEE, 2004, pp. 596-600.

* cited by examiner

*Primary Examiner* — Alan D Hutchinson
(74) *Attorney, Agent, or Firm* — Dinsmore & Shohl LLP

(57) ABSTRACT

A direction discrimination device includes: an extraction unit configured to extract pieces of feature information from an image of a person, each of the pieces of feature information representing a feature of corresponding one of portions of the person; and a discrimination unit configured to discriminate a direction of the person based on the pieces of feature information. The discrimination unit is configured to weight first feature information which is feature information of a portion that is likely to have a difference in the feature between a first direction and a second direction range, more than second feature information which is feature information of a portion that is less likely to have a difference, in determination of the direction of the person. The second
(Continued)

direction range not includes the first direction and includes a second direction opposite to the first direction.

9 Claims, 12 Drawing Sheets

(52) U.S. Cl.
CPC ............. *G06K 9/627* (2013.01); *G08G 1/165* (2013.01); *G08G 1/166* (2013.01)

DIRECTION DISCRIMINATION DEVICE AND DIRECTION DISCRIMINATION METHOD

CROSS-REFERENCE TO RELATED APPLICATIONS

This application claims priority to Japanese Patent Application No. 2016-152338 filed on Aug. 2, 2016, incorporated herein by reference in its entirety.

BACKGROUND

1. Technical Field

The present disclosure relates to a direction discrimination device and a direction discrimination method.

2. Description of Related Art

In the related art, a class classifier (see, for example, Japanese Patent Application Publication No. 2004-127238) that discriminates whether or not input data such as an image (including a target included in an image of an input data) is included in a specific class among a plurality of predefined classes is known.

SUMMARY

In some cases, a class classifier as mentioned above is used to discriminate the direction of a person (pedestrian) included in imaged images of an in-vehicle camera that images the periphery of a vehicle. Based on the discriminated direction of the pedestrian, a control device, such as an electronic control unit (ECU), of the vehicle may perform driving assist operation to avoid collision with the pedestrian. For example, when the pedestrian is in a sidewalk ahead of the vehicle with his or her back to the vehicle, the pedestrian may be unaware of the vehicle. In this case, it can be determined that there is a risk of collision caused by a sudden move of the pedestrian toward a roadway. When the pedestrian who is in the sidewalk ahead of the vehicle faces the roadway, there is a high possibility that the pedestrian enters into the roadway. In this case, it can be determined that there is a high risk of collision caused by the pedestrian moving toward the roadway.

However, the class classifier according to the related art may erroneously discriminate the direction of a pedestrian included in an imaged image of an in-vehicle camera. Accordingly, when the class classifier erroneously discriminates that the pedestrian is in a direction largely different from an actual direction, or in a direction opposite to the actual direction in particular, the following inconveniences may occur. For example, if a pedestrian, who is actually in the sidewalk ahead of the vehicle with his or her back to the vehicle, is erroneously discriminated to be in an opposite direction (i.e., in a direction facing the vehicle), the risk of collision with the pedestrian may incorrectly be determined to be low even though the pedestrian is unaware of the vehicle. If a pedestrian in the sidewalk ahead of the vehicle, who is in a direction of entering the roadway, is erroneously discriminated to be in a direction away from the roadway, the risk of collision with the pedestrian may incorrectly be determined to be low even though there is a high possibility that the pedestrian enters the roadway.

Accordingly, the present disclosure provides a direction discrimination device capable of suppressing erroneous discrimination in which a person included in an image is discriminated to be in a direction largely different from an actual direction.

An aspect of the present disclosure provides a direction discrimination device including: an extraction unit configured to extract pieces of feature information from an image of a person in a captured image, each of the pieces of feature information representing a feature of corresponding one of a plurality of prescribed portions of the person; and a discrimination unit configured to discriminate a direction of the person based on the pieces of feature information extracted by the extraction unit, the discrimination unit being configured to weight first feature information more than second feature information in determination of the direction of the person, the first feature information and the second feature information being among the pieces of feature information, the first feature information being feature information of a portion that is likely to have a difference in the feature between a first direction and a second direction range, the second feature information being feature information of a portion that is less likely to have a difference in the feature between the first direction and the second direction range, the second direction range not including the first direction and including a second direction opposite to the first direction.

According to the above aspect, the direction of a person is discriminated by putting more weight on feature information of a portion that is likely to have a difference in features, such as a silhouette and a texture, between one direction and another direction range than on feature information of a portion that is less likely to have a difference in features between the one direction and the other direction range, the other direction range (not including the one direction and including a direction opposite to the one direction, to be specific) being relatively largely different from the one direction. Accordingly, it becomes possible to suppress erroneous discrimination in which a person facing in one direction is erroneously discriminated to face in another direction range that is largely different from the one direction.

In the above aspect, the discrimination unit may be configured to discriminate whether the direction of the person is included in a first direction range including the first direction or included in a direction range including the second direction range and not including the first direction range, based on a size relation between a value of a specified function having the feature information of each of the plurality of portions as independent variables and a specified value.

According to the above aspect, the feature information of a plurality of portions extracted from an image including a person is extracted and substituted in a specified function having the feature information as an independent variable, and the obtained value is simply compared with a specified value. Therefore, the direction of a person included in an image can easily be discriminated.

in the above aspect, the discrimination unit may be configured to weight the first feature information by multiplying an independent variable, among the independent variables, corresponding to the first feature information by a larger value while multiplying an independent variable corresponding to the second feature information by a smaller value.

In the above aspect, the extraction unit may be configured to: cut a range including the person out of the captured image to create the image of the person; and divide the image of the person into a specified number of regions such that each of the regions includes a corresponding one of the plurality of prescribed portions.

In the above aspect, the specified function and the specified value may be additional values to be added, in a case where it is discriminated whether directions of persons included in a plurality of learning images are included in the first direction range or included in a direction range other than the first direction range respectively, when at least one of following (i) and (ii) is satisfied. (i)A direction of a person in a learning image among the plurality of learning images, not included in the first direction range is erroneously discriminated to be included in the first direction range. (ii) When the direction of the person in the learning image, among the plurality of learning images, included in the first direction range is erroneously discriminated to be included in the direction range other than the first direction range. And the additional values may become larger as a difference in the direction between the direction of the person in the learning image not included in the first direction range and the first direction range is larger, and the additional values may be determined such that a sum of the additional values is minimized.

According to the above aspect, in machine learning using a plurality of learning images, in order to minimize additional values, the specified function and the specified value are optimized so as to prevent the situation where the direction of a person in a learning image, which is included in one direction range having a relatively large difference from another direction range, is erroneously discriminated to be included in the other direction range. Accordingly, it becomes possible to suppress the erroneous discrimination in which the person facing in one direction is discriminated to face another direction range.

In the above aspect, the first direction range may include a direction in which the person in the learning image among the plurality of learning images, faces an imaging device capturing the learning images.

In the above aspect, the specified function may be expressed by a following expression using an independent variable $x_i$ representing N pieces of the feature information ($N \geq 2$) extracted from each of the plurality of portions by the extraction unit, and constants $\phi_i$, $a_i$, and b (i=1, 2, . . . , N)

$$f(x_i) = \sum_{i=1}^{N} (x_i)^{\phi_i} \times a_i + b$$

where the $a_i$ and the b are determined such that the sum of the additional values is minimized.

According to the above aspect, by using, for example, a statistical learning method, such as a nonlinear support vector machine (SVM), constants $a_i$ and b can be obtained as solutions to optimization problems in mathematical programming on the basis of $\phi_i$ (which can be predefined in accordance with known kernel functions or the like) that is a prescribed power exponent of $x_i$.

In the above aspect, the $\phi_i$ may be 1.

According to the above aspect, since the function becomes linear, the constants $a_i$, and b can be obtained more easily as solutions to optimization problems in mathematical programming by using the linear SVM or the like.

A second aspect of the present disclosure provides a direction discrimination method. The direction discrimination method, according to the second aspect, includes: extracting pieces of feature information by an extraction unit, each of the pieces of feature information representing corresponding one of features of a plurality of predefined portions of a person in an image; and discriminating a direction of the person based on the pieces of feature information by a discrimination unit, the discrimination unit weighing, in the discriminating, first feature information more than second feature information, the first feature information and the second feature information being among the pieces of feature information, the first feature information being feature information of a portion that is likely to have a difference in the feature between a first direction and a second direction range, the second feature information being feature information of a portion that is less likely to have a difference in the feature between the first direction and the second direction range, the second direction range not including the first direction and including a second direction opposite to the first direction.

According to the above aspect, it becomes possible to provide a direction discrimination method capable of suppressing erroneous discrimination in which a person included in an image is discriminated to be in a direction largely different from an actual direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the present disclosure will be described with reference to the drawings.

First, the configuration of a class classifier 1 according to an embodiment will be described.

Figure 1:
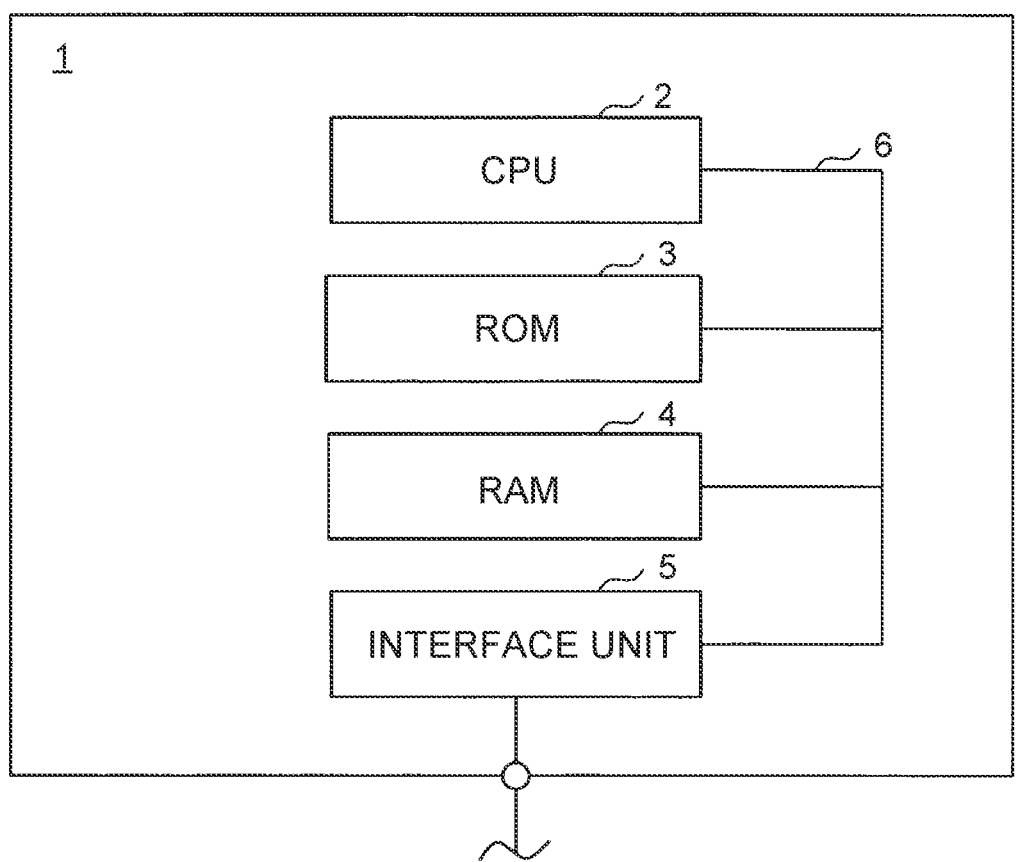
FIG. 1 is a block diagram illustrating one example of the configuration of a class classifier according to an embodiment.
Figure 2:
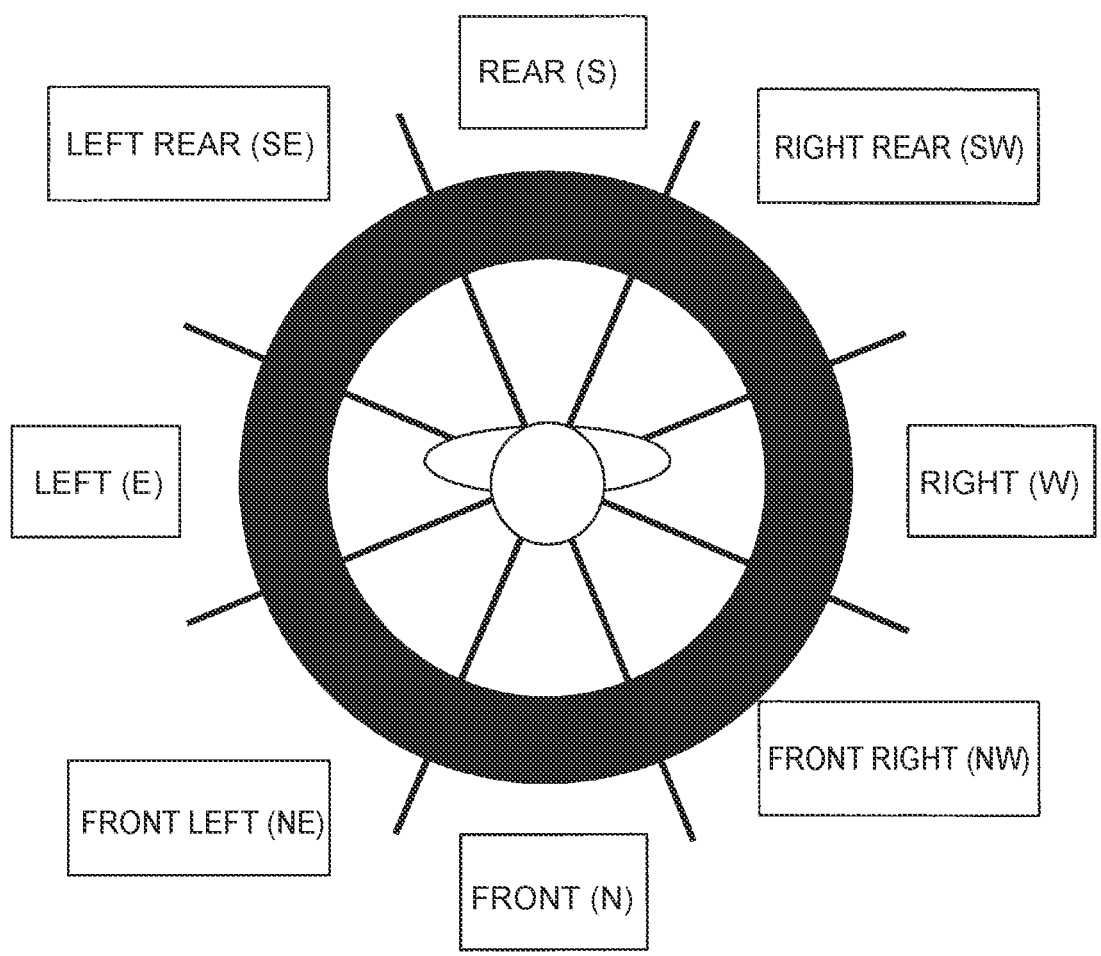
FIG. 2 illustrates direction divisions representing directions of a person.

FIG. 1 is a block diagram illustrating one example of the configuration of the class classifier 1 according to the present embodiment. The class classifier 1 (one example of the direction discrimination device) performs processing of discriminating the direction of a person included in an image. Hereinafter, in this example, the direction of a person is classified into eight direction ranges (a front direction, a front left direction, a left direction, a rear left direction, a rear direction, a rear right direction, a right direction, and a front right direction) divided at every 45 degrees in advance as illustrated in FIG. 2. The class classifier 1 discriminates in which division, among the divisions (referred to as "direction divisions" below), the direction of the person included in an image is included.

As illustrated in FIG. 2, in the present embodiment, the "front direction" represents an angle range of 45 degrees around a direction that faces an imaging direction (camera) of an image for convenience. In the present embodiment, the direction of a person viewed from the top is divided clockwise into direction divisions each representing an angle range of 45 degrees with "front direction" as a starting point. The direction divisions include "front left direction", "left direction, "rear left direction", "rear direction", "rear right direction", "right direction", and "front right direction" in order. The number of the direction divisions representing the direction of a person (division number) may be set to any number. For example, the division number may be 4 corresponding to an angle range of 90 degrees or may be 16 corresponding to an angle range of 22.5 degrees.

The class classifier 1 is mainly configured with a computer including a CPU 2, a ROM 3, a RAM 4, and an interface unit 5 (such as an input-output port and a communication modem) connected with each other through a bus 6. The interface unit 5 receives data (image) input from the outside.

Figure 3:
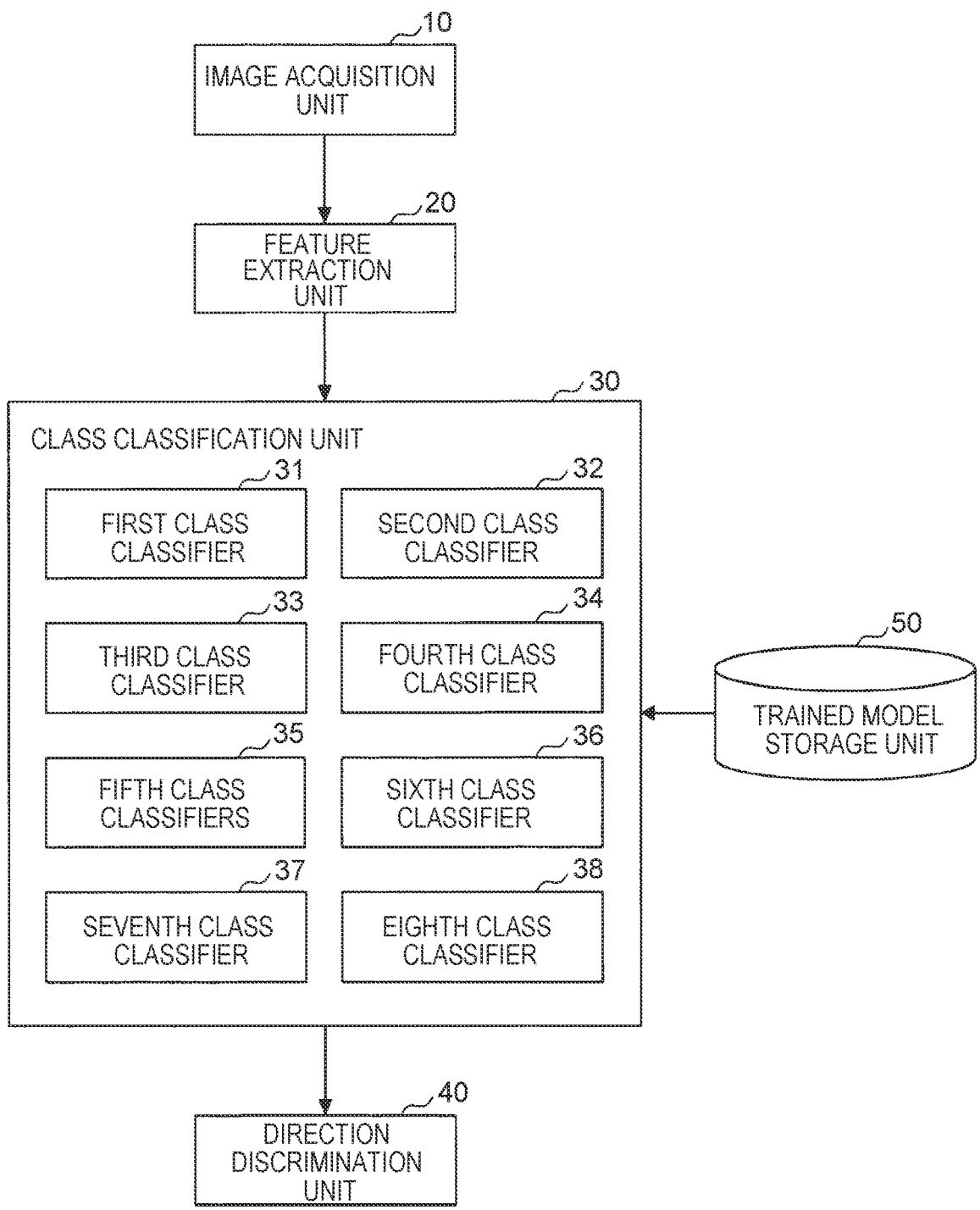
FIG. 3 is a functional block diagram illustrating one example of the configuration of the class classifier according to the present embodiment.

FIG. 3 is a functional block diagram illustrating one example of the configuration of the class classifier 1 according to the present embodiment. The class classifier 1 includes functional units implemented by executing one or more programs stored in the ROM 3 on the CPU 2. For example, the function units include an image acquisition unit 10, a feature extraction unit 20, a class classification unit 30, and a direction discrimination unit 40. For example, the class classifier 1 also includes a trained model storage unit 50 as a recording region defined in an internal memory such as the ROM 3.

The image acquisition unit 10 acquires an image including a person (or an image that possibly includes a person) as a target of direction discrimination. For example, in response to a request from the outside of the class classifier 1, the image acquisition unit 10 acquires an image included in the request as a target of direction discrimination. The image to be acquired by the image acquisition unit 10 may be an image processed by the feature extraction unit 20 for processing. For example, the image to be acquired may be an image of a portion including a target person cut out from an image imaged with a camera. The image to be acquired by the image acquisition unit 10 may be an image not yet processed for processing by the feature extraction unit 20, i.e., may be a raw image imaged by the camera, for example.

The feature extraction unit 20 extracts feature information representing the feature of an image of a predefined portion of a person. For example, the feature extraction unit 20 divides an image cut out from an original image (i.e., a raw image imaged by the camera) as a region where a person is present, and extracts the feature information on each divided image. For example, the feature extraction unit 20 divides an image (referred to as "person image" below), in which a person is fully disposed in the region with a predefined aspect ratio, into a plurality of rectangular portions (subregions) in every direction, and extracts the feature information in each of the rectangular portions. A description is now given of the extraction processing of the feature information performed by the feature extraction unit 20 with reference to FIGS. 4A and 4B. Or the feature extraction unit 20 may create a person image in such a way that an upper end and a lower end of a person are disposed with a specified distance from an upper end and a lower end of an image in a region with a predefined aspect ratio.

When the image acquired by the image acquisition unit 10 is an unprocessed image, an image imaged with any given camera itself is used to recognize a portion in which a person is present, and the recognized portion is cut out to generate a person image. In this case, any one of various known methods may be applied as a method for recognizing the person in the image.

Figure 4A:
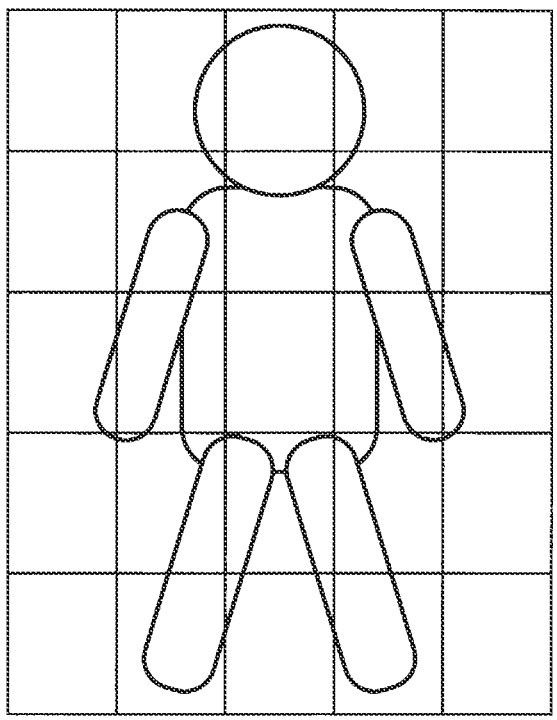
FIG. 4A is an explanatory view illustrating extraction processing of feature information by a feature extraction unit.
Figure 4B:
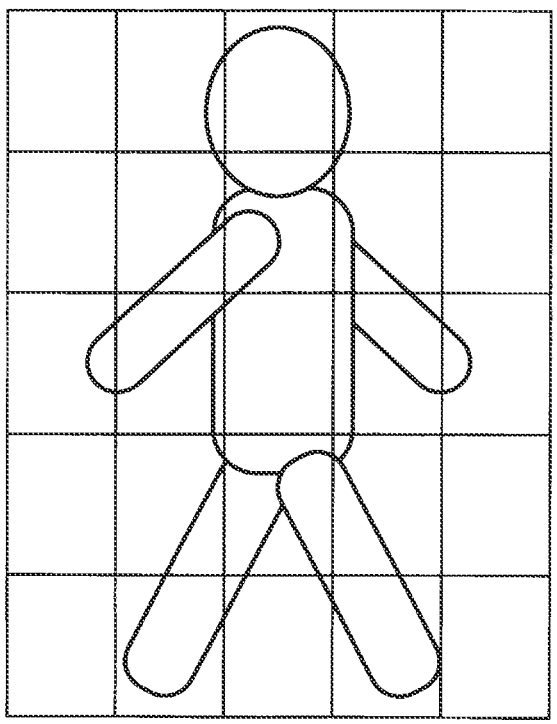
FIG. 4B is an explanatory view illustrating the extraction processing of the feature information by the feature extraction unit.

FIGS. 4A and 4B are explanatory views illustrating one example of the extraction processing of the feature information by the feature extraction unit 20. Specifically, FIGS. 4A and 4B represent person images P1, P2 including a person facing a front side and a person facing a right side, respectively.

As illustrated in FIGS. 4A and 4B, the person images P1, P2 are each divided into a plurality of rectangular portions in every direction as described in the foregoing. In this example, the person images P1, P2 are each divided into 25 rectangular portions, with 5 portions in each direction at equal intervals. Hereinafter, the present embodiment is described on the assumption that a person image is divided into 25 rectangular portions as in this example.

When the person images P1 and P2 are compared, the person facing the front side and the person facing the right side are different from each other, for example, in the silhouettes of arms and legs or in the silhouette of a body (width) portion, for example. For example, although not illustrated in this example, the person facing the front side and the person facing the right side are different from each other in the texture of the head due to a difference in appearance of body parts such as eyes, nose, ears, and hair. That is, these 25 rectangular portions each include feature information that characterizes the direction of a person included in a person image, the feature information including, for example, the silhouette representing the shape of the person, and the texture representing colors or patterns of the person. In the present embodiment, as the feature information representing data such as the silhouette and the texture of a person in a person image, histogram of oriented gradients (HOG) feature values are used. The HOG feature values are multidimensional image feature values obtained by linearly combining histograms of luminance gradient directions (for example, 9 orientations at each 20 degrees) in each of the rectangular portions. Unless otherwise specified, the following description will be made on the assumption that the feature extraction unit 20 extracts the HOG feature value from each of the rectangular portions of a person image.

The number of dimensions of the HOG feature value is determined by the number of regions to extract the histogram, and the number of luminance gradient directions. For example, when each rectangular region is further divided into four subregions, the HOG feature value of each rectangular portion is expressed as the histograms of luminance gradients of each 4 subregions in 9 directions. Therefore, the number of dimensions of the HOG feature value is 36 (=4×9). Although the HOG feature value is used as an image feature value in the present embodiment, other image feature values, such as local binary pattern (LBP) feature values, may properly be used. The number of the rectangular portions generated by dividing a person image may optionally be set. Among the rectangular portions of a person image, those not including part of the person with a high possibility, such as rectangular portions at four corners, may be removed from a feature information extraction target.

With reference again to FIG. 3, the class classification unit 30 performs the processing of classifying (discriminating) the direction of a person based on the feature information (HOG feature value) extracted by the feature extraction unit 20. Specifically, the class classification unit 30 discriminates the direction of a person included in a person image based on the feature information and trained model stored in the trained model storage unit 50. The class classification unit 30 includes a first class classifier 31 to an eighth class classifier 38, each of which discriminates whether or not the direction of a person included in a person image is included in its pertinent direction division (referred to as a target direction division below) among eight direction divisions. Hereinafter, the outline of the first class classifier 31 to the eighth class classifier 38 will be described with reference to FIG. 5.

Figure 5:
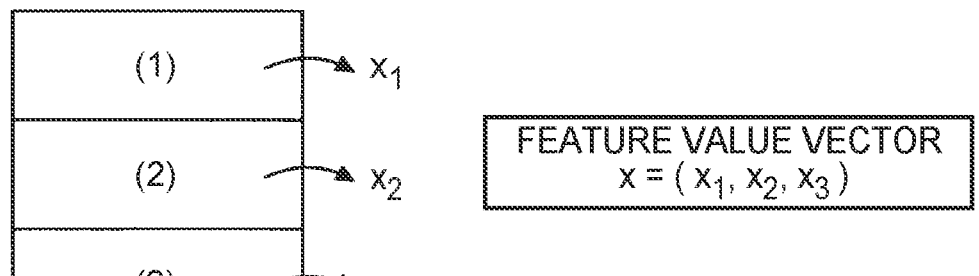
FIG. 5 is an explanatory view illustrating a method for discriminating the direction of a person.
Figure 5:
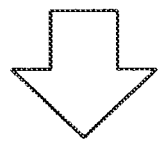
Figure 5:
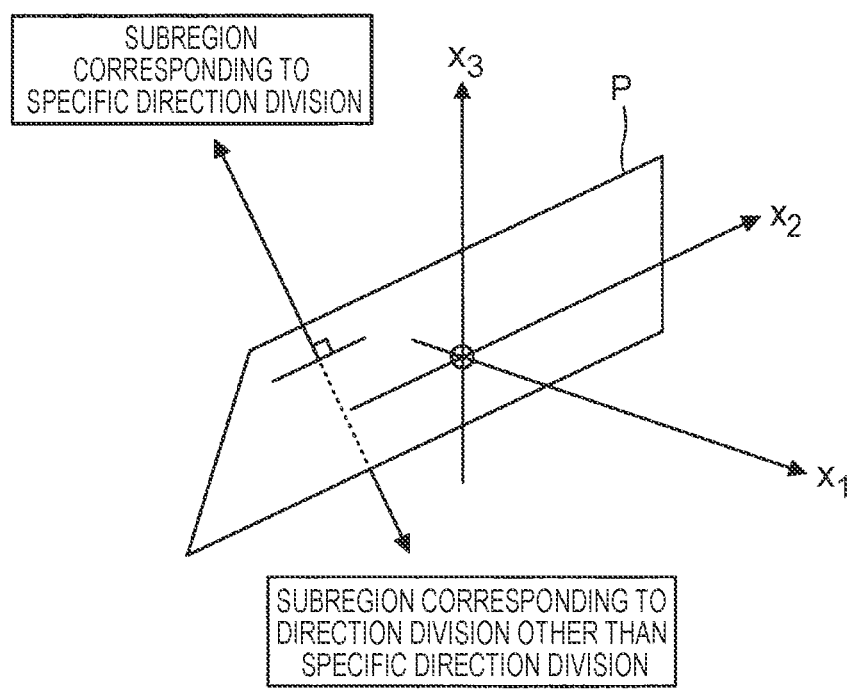

FIG. 5 is an explanatory view illustrating a method for discriminating the direction of a person included in a person image. Specifically, FIG. 5 illustrates a method for discriminating the direction of a person in a simplified case, in which a person image is divided into three rectangular portions, and one piece of feature information is extracted from each of the three rectangular portions.

Each of the rectangular portions obtained by dividing a person image includes the feature information that characterizes the direction of a person as described in the foregoing. The feature information extracted from each of the rectangular portions is quantified into feature values $x_1$ to $x_3$. Accordingly, a point (referred to as "feature value vector") $x=(x_1,x_2,x_3)$ expressed as a combination of the feature values $x_1$ to $x_3$ may have deviation in a distribution in a three-dimensional vector space (input space corresponding to the combination of the feature values), depending on the direction of the person included in the person image. That is, between a set of the feature value vectors corresponding to person images included in a certain specific direction division on the input space and a set of the feature value vectors corresponding to person images not included in the specific direction division (i.e., included in direction divisions other than the specific direction division), a separating plane P which separates these sets of the feature value vectors can be set based on a specified rule as indicated in Expression (1).

$$w^T x+b=w_1 \cdot x_1+w_2 \cdot x_2+w_3 \cdot x_3+b=0 \quad (1)$$

A weight vector $w=(w_1,w_2,w_3)$ and a bias b (scalar quantity) are parameters which determine the separating plane P.

As illustrated in FIG. 5, the separating plane P can separate the three-dimensional input space into a subregion corresponding to a target direction division and a subregion corresponding to the direction divisions other than the target direction division.

Generally, as described in the foregoing, a person image is divided into a large number of (25 in the present embodiment) rectangular portions, and a multidimensional feature value (HOG feature values in the present embodiment) is extracted from each of the rectangular portions. In this case, a feature value vector $x=(x_1,x_2, \ldots ,x_N)$ expressed as a combination of M-dimensional (M) future values $x_1, x_2, x_M, x_{M-1}, x_{M+2}, x_{2K}, \ldots, x_N$ (N=K·M) extracted from each of K rectangular portions is four-dimensional or more. Accordingly, the input space is expanded (generalized) to an N-dimensional (N≥2) input space including four dimensions or more. As a result, between a set of the feature vectors corresponding to person images included in a certain specific direction division on the input space and a set of the feature vectors corresponding to person images not included in the specific direction division (i.e., included in the direction divisions other than the specific direction division), a separating hyperplane which separates these sets of the feature vectors can be set based on a specified rule as indicated in Expression (2).

$$w^T x+b=w_1 \cdot x_1+w_2 \cdot x_2+ \ldots +w_N \cdot x_N+b=0 \quad (2)$$

A weight vector $w=(w_1,w_2, \ldots ,w_n)$ and a bias b (scalar quantity) are parameters which determine the separating hyperplane as in the case where the input space is three-dimensional.

Therefore, the first class classifier 31 to the eighth class classifier 38 each discriminate whether or not the feature value vector x extracted from the person image is included in a subregion corresponding to their own target direction divisions in the subregions separated by the separating hyperplane, or included in the direction divisions other than their own target direction divisions. Specifically, the feature value vector x extracted from a person image is substituted for a function f(x) in Expression (3) corresponding to the left side of Expression (2). Based on whether the resultant value is a positive value (larger than zero) or a negative value (smaller than zero), the first class classifier 31 to the eighth class classifier 38 can discriminate whether or not the direction of the person included in the person image is included in each of their target direction divisions.

$$f(x)=w^T x+b=w_1 \cdot x_1+w_2 \cdot x_2+ \ldots +w_N \cdot x_N+b \quad (3)$$

A separating hyperplane, i.e., parameters (a weight vector w and a bias b) which determine the separating hyperplane, can be generated as trained model by using the statistical learning technique (SVM) as described later. When the function f(x)=0, it may optionally be determined whether the direction of the person is included in the target direction division or the direction of the person is not included in the target direction division. It is also possible to delete the constant term (bias b) from the function f(x) and to determine whether or not the direction of a person is included in the target direction division based on a size relation between the function f(x) without the constant term, and a specified value corresponding to the constant term (bias b). It is also possible to further expand the separating hyperplane to obtain a separating hypercurve which separates the input space into a subregion corresponding to the target direction division and a subregion corresponding to the direction divisions other than the target direction division. That is, it may be discriminated whether or not the direction of the person included in the person image is included in the target direction division based on whether the value of function $f(x_i)$ corresponding to the left side of Expression (4) that expresses a separating hyperplane ($\phi_i=1$) or a separating hypercurve ($\phi_i \neq 0$) is a positive value (larger than zero) or a negative value (smaller than zero). In this case, the separating hypercurve, i.e., the respective parameters ($\phi_i$, $a_i$, b), which determine the separating hypercurve, may be generated as trained model by using nonlinear SVM by a kernel method (kernel trick) or the like as described later. That is, the parameters $a_i$, b can be obtained as solutions to optimization problems in mathematical programming or the like on the basis of $\phi_i$ (which can be defined in accordance with known kernel functions or the like) that is a predefined power exponent of $x_i$.

$$f(x_i) = \sum_{i=1}^{N} (x_i)^{\varphi_i} \times a_i + b = 0 \quad (4)$$
$$(i = 1, \ldots, N)$$

For example, in consideration of a relationship between the direction of a person and the feature values of the respective rectangular portions or the like, given two or more feature values, out of the feature values $x_i$ extracted from the respective rectangular portions, may be joined to generate a new feature value vector X. For example, based on any two feature values $x_j$, $x_k$ (j, k=1, 2, . . . , N) out of the feature values $x_i$, a plurality of feature values $x_{jk}=a_{jk} \cdot x_j^{\phi j} \cdot x_k^{\phi k}$ may be generated with use of constants $a_{jk}$, $\phi_j$, and $\phi_k$. By combining the generated feature values, a new feature value vector X may be generated. Also in this case, the direction of a person included in a person image can be discriminated by using a separating hyperplane or a separating hypercurve relative to the newly generated feature value vector X in a similar manner as in the aforementioned case.

With reference to FIG. 3 again, each of the first class classifier 31 to the eighth class classifier 38 will be described.

The first class classifier 31 discriminates whether or not the direction of a person included in a person image is a front direction based on the feature information extracted by the feature extraction unit 20 and the trained model stored in the trained model storage unit 50. For example, the trained model storage unit 50 stores, as the trained model, data on a first separating hyperplane which separates an N-dimensional space (input space) corresponding to a combination of HOG feature values of respective rectangular portions of the person image into a subregion corresponding to the front direction and a subregion corresponding to the directions other than the front direction. The first class classifier 31 discriminates whether the direction of the person is the front direction or one of the directions other than the front direction based on whether the feature value vector x on the input space, which is expressed as a combination of the HOG feature values of the respective rectangular portions of the person image, is on the side corresponding to the front direction or on the side corresponding to the directions other than the front direction, out of subregions separated by the first separating hyperplane.

The first class classifier 31 also generates information (probability information) representing the probability of a discrimination result ("front direction" or "the directions other than front direction"). For example, the first class classifier 31 calculates a distance between the feature value vector x and the first separating hyperplane as the probability information. This is because the probability of the discrimination result is considered to become higher as the feature value vector x is separated further from the first separating hyperplane.

The first class classifier 31 may integrate the discrimination result and the information indicative of the probability as a score. For example, when discriminating that the direction of the person is the front direction, the first class classifier 31 may output a distance between the feature value vector x and the first separating hyperplane as a score. When discriminating that the direction of the person is one of the directions other than the front direction, the first class classifier 31 may output a value obtained by multiplying the distance between the feature value vector x and the first separating hyperplane by −1 as a score. Accordingly, the positive-negative sign of the score can indicate whether the direction of the person is discriminated as the front direction or discriminated as one of the other directions. In addition, the absolute value of the score can indicate the probability.

As is the case of the first class classifier 31, the second class classifier 32 discriminates whether or not the direction of a person included in a person image is a front left direction based on the feature information extracted by the feature extraction unit 20 and the trained model stored in the trained model storage unit 50. For example, the trained model storage unit 50 stores, as the trained model, data on a second separating hyperplane which separates the input space into a subregion corresponding to a front left direction and a subregion corresponding to the directions other than the front left direction. The second class classifier 32 discriminates whether the direction of the person is the front left direction or one of the other directions based on whether or not the feature value vector x is on the side corresponding to the front left direction or on the side corresponding to the directions other than the front left direction, among the subregions separated by the second separating hyperplane.

The second class classifier 32 also generates the probability information as is the case of the first class classifier 31. For example, the second class classifier 32 calculates a distance between the feature value vector x and the second separating hyperplane as the probability information. The second class classifier 32 may integrate the discrimination result and the information indicative of the probability as a score as in the case of the first class classifier 31.

As is the case of the first class classifier 31 or other class classifiers, the third class classifier 33 discriminates whether or not the direction of a person included in a person image is a left direction based on the feature information extracted by the feature extraction unit 20 and the trained model stored in the trained model storage unit 50. For example, the trained model storage unit 50 stores, as the trained model, data on a third separating hyperplane which separates the input space into a subregion corresponding to the left direction and a subregion corresponding to the directions other than the left direction. The third class classifier 33 discriminates whether the direction of the person is the left direction or one of the directions other than the left direction based on whether or not the feature value vector x is on the side corresponding to the left direction or on the side corresponding to the directions other than the left direction, among the subregions separated by the third separating hyperplane.

The third class classifier 33 also generates the probability information as in the case of the first class classifier 31 or other class classifiers. For example, the third class classifier 33 calculates a distance between the feature value vector x and the third separating hyperplane as the probability information. The third class classifier 33 may integrate the discrimination result and the information indicative of the probability as a score as in the case of the first class classifier 31 or other class classifiers.

As is the case of the first class classifier 31 or other class classifiers, the fourth class classifier 34 discriminates whether or not the direction of a person included in a person image is a rear left direction based on the feature information extracted by the feature extraction unit 20 and the trained model stored in the trained model storage unit 50. For example, the trained model storage unit 50 stores, as the trained model, data on a fourth separating hyperplane which separates the input space into a subregion corresponding to the rear left direction and a subregion corresponding to the directions other than the rear left direction. The fourth class classifier 34 discriminates whether the direction of the person is the rear left direction or one of the directions other than the rear left direction based on whether or not the feature value vector x is on the side corresponding to the rear left direction or on the side corresponding to the directions other than the rear left direction, among the subregions separated by the fourth separating hyperplane.

The fourth class classifier 34 also generates the probability information as in the case of the first class classifier 31 or other class classifiers. For example, the fourth class classifier 34 calculates a distance between the feature value vector x and the fourth separating hyperplane as the probability information. The fourth class classifier 34 may integrate the discrimination result and the information indicative of the probability as a score as in the case of the first class classifier 31 or other class classifiers.

As is the case of the first class classifier 31 or other class classifiers, the fifth class classifier 35 discriminates whether or not the direction of a person included in a person image is a rear direction based on the feature information extracted by the feature extraction unit 20 and the trained model stored in the trained model storage unit 50. For example, the trained model storage unit 50 stores, as the trained model, data on a fifth separating hyperplane which separates the input space into a subregion corresponding to the rear direction and a subregion corresponding to the directions other than the rear direction. The fifth class classifier 35 discriminates whether the direction of the person is the rear direction or one of the directions other than the rear direction based on whether or not the feature value vector x is on the side corresponding to the rear direction or on the side corresponding to the directions other than the rear direction, among the subregions separated by the fifth separating hyperplane.

The fifth class classifier 35 also generates the probability information as in the case of the first class classifier 31 or other class classifiers. For example, the fifth class classifier 35 calculates a distance between the feature value vector x and the fifth separating hyperplane as the probability information. The fifth class classifier 35 may integrate the discrimination result and the information indicative of the probability as a score as in the case of the first class classifier 31 or other class classifiers.

As in the case of the first class classifier 31 or other class classifiers, the sixth class classifier 36 discriminates whether or not the direction of a person included in a person image is a rear right direction based on the feature information extracted by the feature extraction unit 20 and the trained model stored in the trained model storage unit 50. For example, the trained model storage unit 50 stores, as the trained model, data on a sixth separating hyperplane which separates the input space into a subregion corresponding to the rear right direction and a subregion corresponding to the directions other than the rear right direction. The sixth class classifier 36 discriminates whether the direction of the person is the rear right direction or one of the directions other than the rear right direction based on whether or not the feature value vector x is on the side corresponding to the rear right direction or on the side corresponding to the directions other than the rear right direction, among the subregions separated by the sixth separating hyperplane.

The sixth class classifier 36 also generates the probability information as in the case of the first class classifier 31 or other class classifiers. For example, the sixth class classifier 36 calculates a distance between the feature value vector x and the sixth separating hyperplane as the probability information. The sixth class classifier 36 may integrate the discrimination result and the information indicative of the probability as a score as in the case of the first class classifier 31 or other class classifiers.

As is the case of the first class classifier 31 or other class classifiers, the seventh class classifier 37 discriminates whether or not the direction of a person included in a person image is a right direction based on the feature information extracted by the feature extraction unit 20 and the trained model stored in the trained model storage unit 50. For example, the trained model storage unit 50 stores, as the trained model, data on a seventh separating hyperplane which separates the input space into a subregion corresponding to the right direction and a subregion corresponding to the directions other than the right direction. The seventh class classifier 37 discriminates whether the direction of the person is the right direction or one of the directions other than the right direction based on whether or not the feature value vector x is on the side corresponding to the right direction or on the side corresponding to the directions other than the right direction, among subregions separated by the seventh separating hyperplane.

The seventh class classifier 37 also generates the probability information as in the case of the first class classifier 31 or other class classifiers. For example, the seventh class classifier 37 calculates a distance between the feature value vector x and the seventh separating hyperplane as the probability information. The seventh class classifier 37 may integrate the discrimination result and the information indicative of the probability as a score as in the case of the first class classifier 31 or other class classifiers.

As is the case of the first class classifier 31 or other class classifiers, the eighth class classifier 38 discriminates whether or not the direction of a person included in a person image is a front right direction based on the feature information extracted by the feature extraction unit 20 and the trained model stored in the trained model storage unit 50. For example, the trained model storage unit 50 stores, as the trained model, data on an eighth separating hyperplane which separates the input space into a subregion corresponding to the front right direction and a subregion corresponding to the directions other than the front right direction. The eighth class classifier 38 discriminates whether the direction of the person is the front right direction or one of the directions other than the front right direction based on whether or not the feature value vector x is on the side corresponding to the front right direction or on the side corresponding to the directions other than the front right direction, among the subregions separated by the eighth separating hyperplane.

The eighth class classifier 38 also generates the probability information as in the case of the first class classifier 31 or other class classifiers. For example, the eighth class classifier 38 calculates a distance between the feature value vector x and the eighth separating hyperplane as the probability information. The eighth class classifier 38 may integrate the discrimination result and the information indicative of the probability as a score as in the case of the first class classifier 31 or other class classifiers.

The class classification unit 30 outputs the discrimination result and probability information (or the score as an integration of the discrimination result and the probability information) of each of the first class classifier 31 to the eighth class classifier 38 to the direction discrimination unit 40.

The direction discrimination unit 40 finally discriminates which direction division, among eight direction divisions divided in advance, the direction of a person included in a person image is included, based on each of the discrimination results and probability information (or the scores) of the first class classifier 31 to the eighth class classifier 38 input through the class classification unit 30. For example, when only one of the first class classifier 31 to the eighth class classifier 38 discriminates that the direction of the person included in the person image coincides with the direction of its target division (for example, when the first class classifier 31 discriminates that the direction of the person is "front direction"), the direction discrimination unit 40 discriminates that the direction of the pertinent target division is the direction of the person. For example, when two or more of the first class classifier 31 to the eighth class classifier 38 discriminate that the direction of the person coincides with their target divisions, the direction discrimination unit 40 compares the probability information of the two or more pertinent class classifiers. As a result of comparison, the direction discrimination unit 40 may discriminate the direction of the target division corresponding to the probability information indicating higher probability (for example, a longer distance between the feature vector x and the separating hyperplane) as the direction of the person. The direction discrimination unit 40 may discriminate, as the direction of the person included in the person image, the direction of the target division corresponding to one class classifier, among the first class classifier 31 to the eighth class classifier 38, whose score is a largest positive value.

A description is now given of a machine learning device 100 that generates the trained model stored in the trained model storage unit 50, i.e., the first to eighth separating hyperplanes representing discrimination boundaries in the input space.

Figure 6:
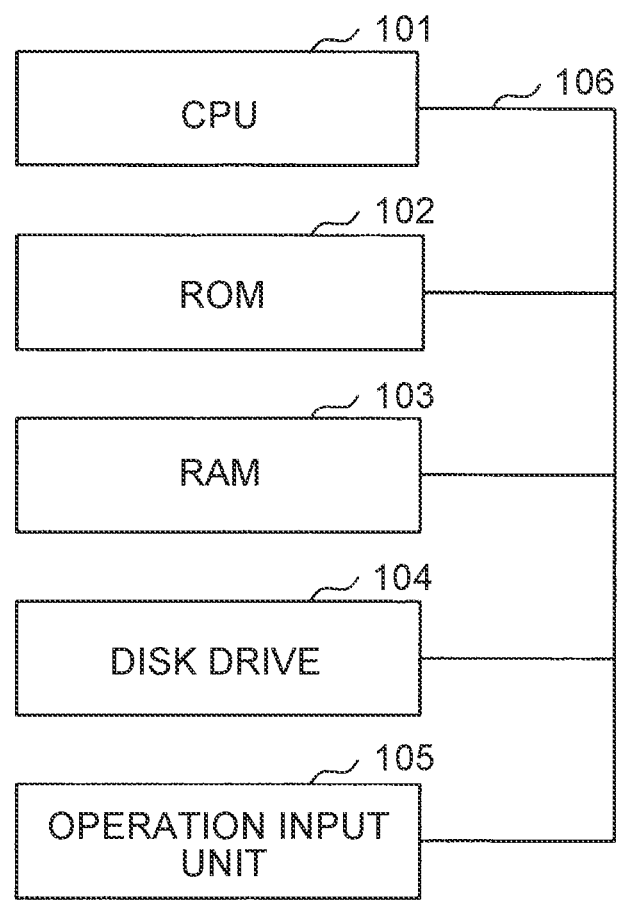
FIG. 6 is a block diagram illustrating one example of the configuration of a machine learning device according to the present embodiment.

FIG. 6 is a block diagram schematically illustrating one example of the configuration of the machine learning device 100 according to the present embodiment. The machine learning device 100 is mainly configured with a computer including a CPU 101, a ROM 102, a RAM 103, a disk drive 104, and an operation input unit 105 (such as a keyboard) which are connected with each other through a bus 106.

Figure 7:
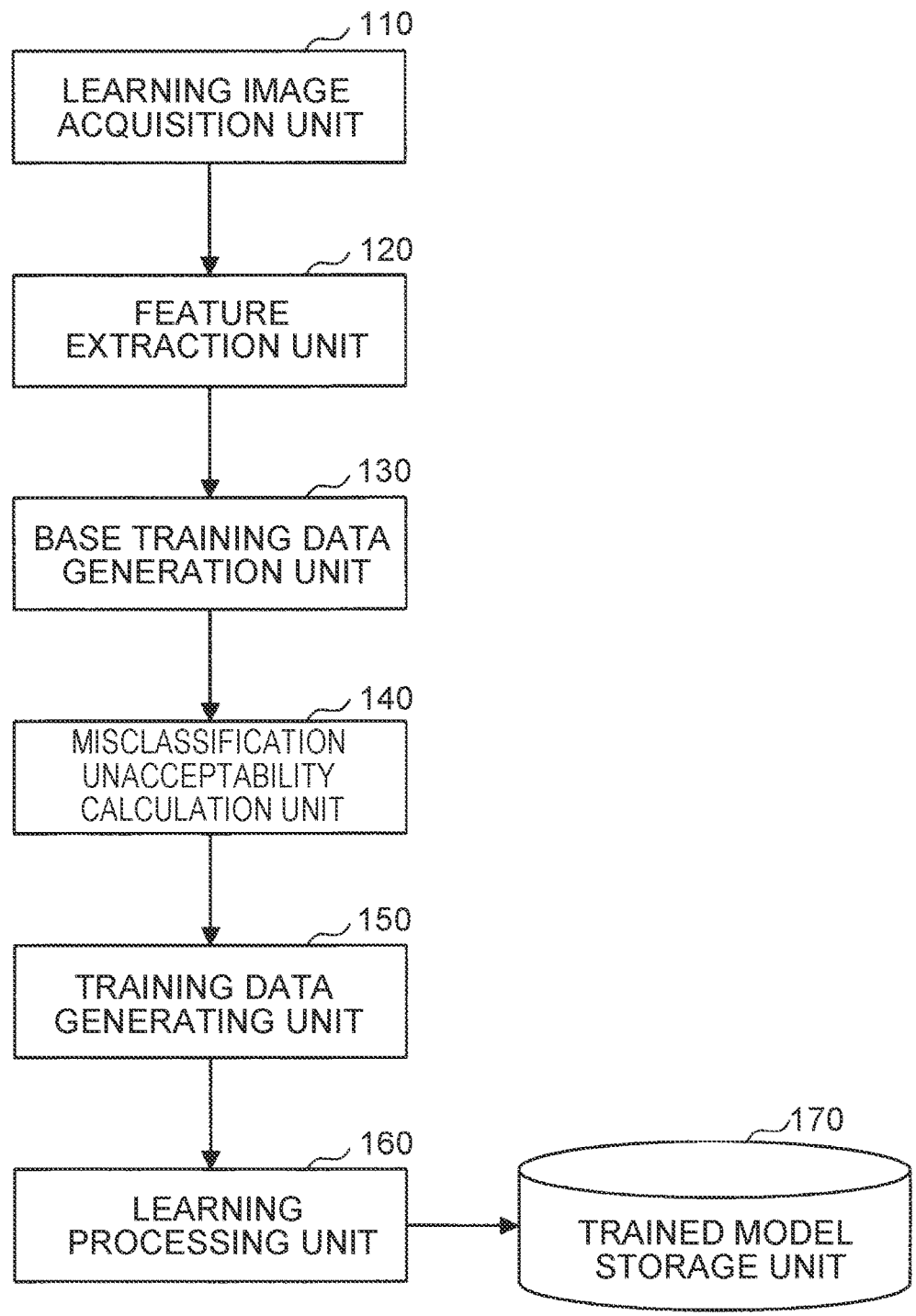
FIG. 7 is a functional block diagram illustrating one example of the configuration of the machine learning device according to the present embodiment.

FIG. 7 is a functional block diagram illustrating one example of the configuration of the machine learning device 100 according to the present embodiment. The machine learning device 100 according to the present embodiment generates separating hyperplanes (first to eighth separating hyperplanes) as the trained model by the SVM which is a statistical learning method. The separating hyperplane separates the aforementioned input space into a subregion corresponding to one direction division included in the eight direction divisions divided in advance, and a subregion corresponding to the direction divisions other than the one direction division. The machine learning device 100 includes functional units which are implemented by, for example, executing one or more programs stored in the ROM 102 on the CPU 101. The functional units include a learning image acquisition unit 110, a feature extraction unit 120, a base training data generation unit 130, an misclassification unacceptability calculation unit 140, a training data generating unit 150, and a learning processing unit 160. The machine learning device 100 also includes, for example, a trained model storage unit 170 defined as a recording region of an internal memory such as the ROM 102 or various recording disks (such as DVD-R) inserted in the disk drive 104.

The learning image acquisition unit 110 acquires learning images from the internal memory such as the ROM 102 and the various disks inserted in the disk drive 104 in response to user operation in the operation input unit 105 or in accordance with processing based on predefined programs. The learning images are a large number of person images prepared for each eight direction division divided in advance. Each person image is associated with a label (correct direction label) representing the direction of the person.

As in the case of the feature extraction unit 20 in the class classifier 1, the feature extraction unit 120 extracts feature information representing the features of predefined portions of the person in the learning image (person image) (i.e., rectangular portions that are subregions obtained by dividing the person image). In the present embodiment, the feature extraction unit 120 extracts the HOG feature value in each of the rectangular portions of the person image as described in the foregoing.

The base training data generation unit 130 generates the base training data by combining the direction (any one of the aforementioned eight direction divisions divided in advance) of the person with the feature information (HOG feature value) in each of the learning images.

The misclassification unacceptability calculation unit 140 calculates a penalty value (misclassification penalty $\zeta$) when the direction of a person in each learning image is incorrectly classified in the machine learning processing performed by the learning processing unit 160 or in optimization processing of the separating hyperplanes performed by the SVM, to be specific. The learning images are incorrectly classified in total eight patterns, in which seven patterns involve misclassification in specific directions different from a correct direction (in any one of the seven direction divisions other than the direction division corresponding to the correct direction) and one pattern involves misclassification that the direction division is not included in the correct division, the misclassification being caused by erroneous discrimination regarding whether or not the direction is included in a direction division (correct division) corresponding to the correct direction. Accordingly, the misclassification unacceptability calculation unit 140 calculates eight misclassification penalties $\zeta$ for each of the learning images, and generates an misclassification penalty vector by combining the eight misclassification penalties $\zeta$.

Specifically, the misclassification unacceptability calculation unit 140 determines the misclassification penalty $\zeta$ in the case where the direction of the person in each of the learning images is incorrectly classified in a specific direction division, in accordance with a difference between the direction division corresponding to the correct direction and the specific direction division. That is, the misclassification unacceptability calculation unit 140 increases the misclassification penalty $\zeta$ as the difference between the direction division corresponding to the correct direction and the specific direction division becomes larger. For example, the misclassification unacceptability calculation unit 140 sets the misclassification penalty $\zeta$ to a relatively small value (for example, $\zeta=0.5$) when the incorrectly classified specific direction division is adjacent to the direction division corresponding to the correct direction. When the incorrectly classified specific direction division is not adjacent to the direction division corresponding to the correct direction, that is, when the specific direction division is two or more divisions away from the direction division corresponding to the correct direction, the misclassification unacceptability calculation unit 140 set the misclassification penalty $\zeta$ to a relatively large value (for example, $\zeta=1.0$). This makes it possible to prevent the direction of the person in each of the learning images from being incorrectly classified into a direction division (for example, the direction division opposite to the direction division corresponding to the correct direction) largely separated from the correct direction in the later-described optimization processing of the separating hyperplane. When it is discriminated whether or not the direction of a person in each of the learning images is included in the direction division corresponding to the correct direction, and as a result, the direction is incorrectly classified into the direction division corresponding to an incorrect direction, the misclassification penalty $\zeta$ is set to a relatively large value (for example, $\zeta=1.0$). When the direction is incorrectly classified into the direction division corresponding to an incorrect direction (that is, for example, when it is discriminated whether or not the direction is the front direction, and as a result, the direction is classified not into the correct front direction but into one of the directions other than the front direction), the misclassification penalty $\zeta$ is set to a relatively large value (for example, $\zeta=1.0$). This is because the directions other than the correct direction include the direction divisions which are not adjacent to and largely separated from the direction division corresponding to the correct direction.

The misclassification penalty $\zeta$ may be configured to increase in stages as a difference between the direction division corresponding to the correct direction and the specific direction division becomes larger.

The training data generating unit 150 generates training data by combining the base training data corresponding to each of the learning images and the misclassification penalties $\zeta$ (misclassification penalty vector) of each of the learning images. That is, the training data includes the direction of a person, the feature information (HOG feature value), and the misclassification penalty vector for each of the learning images.

The learning processing unit 160 generates, using the SVM (soft margin SVM, to be specific) that is a statistical learning method, the separating hyperplanes (first to eighth separating hyperplanes) which separate the aforementioned input space into a subregion corresponding to one direction division included in eight direction divisions divided in advance and a subregion corresponding to the direction divisions other than the one direction division. The learning processing unit 160 stores the generated trained model that is the first to eighth separating hyperplane data in the trained model storage unit 170.

Specifically, the learning processing unit 160 searches for the separating hyperplanes (first to eighth separating hyperplanes) which minimize a sum of the misclassification penalties $\zeta$ of the learning image corresponding to the incorrectly classified direction of a person with use of an optimization technique such as known mathematical programming. More specifically, the parameters (weight vector w and bias b) in Expression (2) are optimized so as to minimize the sum of the misclassification penalties $\zeta$ of the learning image corresponding to the incorrectly classified direction of a person. Generally, due to such reasons as overlapping of the feature value vectors x of the respective learning images on the input space, it is often difficult to search for the separating hyperplane that completely separates the learning image corresponding to one direction division and the learning image corresponding to the direction divisions other than the one direction division. Accordingly, in the soft margin SVM, the separating hyperplanes are optimized so as to minimize the penalties predefined for misclassification while permitting the misclassification. As described in the foregoing, the present embodiment adopts the misclassification penalties $\zeta$ which become larger as a difference between the specific direction division, into which the direction of the person in each learning image is incorrectly classified, and the direction division corresponding to the correct direction is larger. As described in the foregoing, when it is discriminated whether or not the direction of the person in each of the learning images is included in the direction division corresponding to the correct direction, and as a result of the discrimination, the direction is incorrectly classified into the direction division corresponding to an incorrect direction, the misclassification penalty $\zeta$ is set to a relatively large value. This makes it possible to generate the separating hyperplanes that are less likely to cause the direction of the person in each of the learning images to be incorrectly classified into the direction division largely separated from the correct direction (for example, the direction division opposite to the direction division corresponding to the correct direction).

In other words, the learning processing unit 160 searches for the separating hyperplanes (first to eighth separating hyperplanes) by putting more weight on the feature information (HOG feature value) of a rectangular portion, among the respective rectangular portions of a learning image, that is likely to have a difference in the feature between one direction division and another direction division (i.e., a direction division not including the one direction division but including a direction division opposite to the one direction division, that is, a direction division two or more direction divisions separated from the one direction division in this example) largely different from the one direction division than on the feature information (HOG feature value) of a rectangular portion that is less likely to have the difference in the feature between the one direction division and the other direction division. Accordingly, the class classifier 1 (the first class classifier 31 to the eighth class classifier 38) discriminates the direction of a person included in a person image by putting more weight on the feature information (HOG feature value), among the respective portions of a person image, that is likely to have a difference in the feature, such as a silhouette and a texture, between one direction division and another direction division largely different from the one direction than on the feature information (HOG feature value) that is less likely to have the difference in the feature between the one direction division and the other direction. Therefore, the class classifier 1 can suppress erroneous discrimination in which the direction of the person is discriminated to be a direction division largely different from the correct direction division (for example, a direction division opposite to the direction division corresponding to the correct direction).

In the present embodiment, the other direction division largely different from the one direction division includes the direction divisions other than adjacent direction divisions, i.e., the direction divisions two or more divisions separated from the one direction division. However, a direction range where erroneous determination is not permitted may appropriately be set to a range of three or more divisions separated from the one direction division. Although the machine learning device 100 searches for the separating hyperplanes in the input space by the SVM, the machine learning device 100 may be configured to search for the separating hyperplanes in a high-dimensional feature space by a kernel method (kernel trick). That is, the machine learning device 100 may search for the above-stated separating hypercurves in the input space with the nonlinear SVM.

A description is now given of the processing flow by the machine learning device 100.

Figure 8:
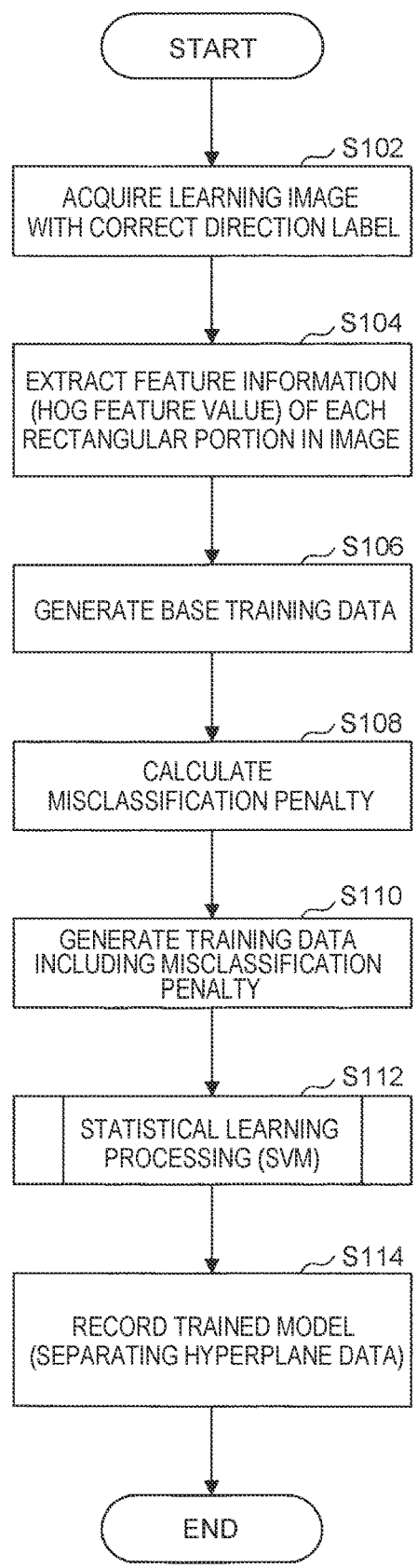
FIG. 8 is a flowchart schematically illustrating one example of statistical learning processing by the machine learning device according to the present embodiment.

FIG. 8 is a flowchart schematically illustrating one example of the processing by the machine learning device 100 according to the present embodiment.

In step S102, the learning image acquisition unit 110 acquires a learning image associated with a correct direction label.

In step S104, the feature extraction unit 120 extracts the feature information (HOG feature value) of respective rectangular portions for each learning image as described in the foregoing.

In step S106, the base training data generation unit 130 generates the base training data by combining the direction and the feature information (HOG feature value) of the person in the learning image as described in the foregoing.

In step S108, the misclassification unacceptability calculation unit 140 calculates eight misclassification penalties ζ for each of the learning images, and generates an misclassification penalty vector by combining the eight misclassification penalties ζ as described in the foregoing.

In step S110, the training data generating unit 150 generates the training data by combining the base training data corresponding to each of the learning images and the misclassification penalties ζ (misclassification penalty vectors) of each of the learning images as described in the foregoing.

In step S112, the learning processing unit 160 performs statistical learning processing, i.e., learning processing with SVM as described in the foregoing.

In step S114, the learning processing unit 160 records the generated trained model (the first to eighth separating hyperplane data) on the trained model storage unit 170.

Figure 9:
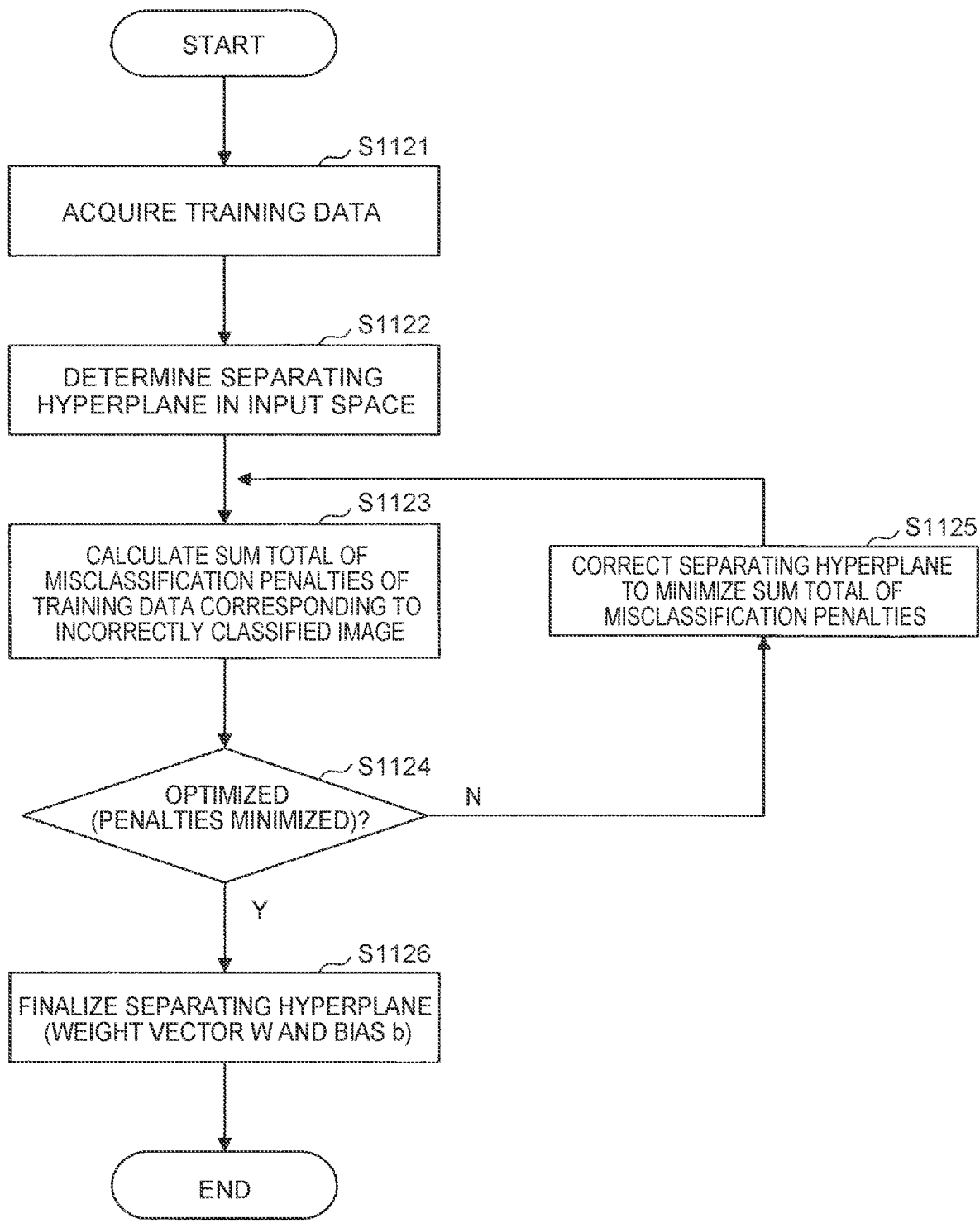
FIG. 9 is a sub-flowchart schematically illustrating one example of the statistical learning processing by the machine learning device according to the present embodiment.

FIG. 9 is one example of the processing by the machine learning device 100 according to the present embodiment. Specifically, FIG. 9 is a sub-flowchart schematically illustrating the statistical learning processing of step S112 in FIG. 8.

The processing in the sub-flowchart illustrated in FIG. 9 is executed for each of the first to eighth separating hyperplanes. That is, the processing in this sub-flowchart is executed eight times.

In step S1121, the learning processing unit 160 acquires training data.

In step S1122, the learning processing unit 160 determines a separating hyperplane on the input space, i.e., the parameters (weight vector w and bias b) of Expression (2).

In step S1123, the learning processing unit 160 calculates a sum total (sum total value) of misclassification penalties ζ of the learning image corresponding to incorrectly classified direction of the person on the separating hyperplane determined in step S1122.

In step S1124, the learning processing unit 160 determines whether or not the separating hyperplane is optimized, i.e., whether or not the sum total value of the misclassification penalties ζ is minimum. When it is not determined that the sum total value of the misclassification penalties ζ is minimum, the learning processing unit 160 advances to step S1125. When it is determined that the sum total value of the misclassification penalties ζ is minimum, the learning processing unit 160 advances to step S1126.

In step S1125, the learning processing unit 160 corrects the separating hyperplane, i.e., the parameters (weight vector w and bias b) of Expression (2) in such a way that the sum total value of the misclassification penalties is minimized, and returns to step S1123.

The processing of steps S1122 to S1125 can be executed by using known mathematical programming, such as a linear programming, for example.

In step S1126, the learning processing unit 160 finalizes the separating hyperplane, i.e., the parameters (weight vector w and bias b) in Expression (2), and ends the processing in this flow.

Now, the function of the statistical learning method by the machine learning device 100 according to the present embodiment is further described.

Figure 10:
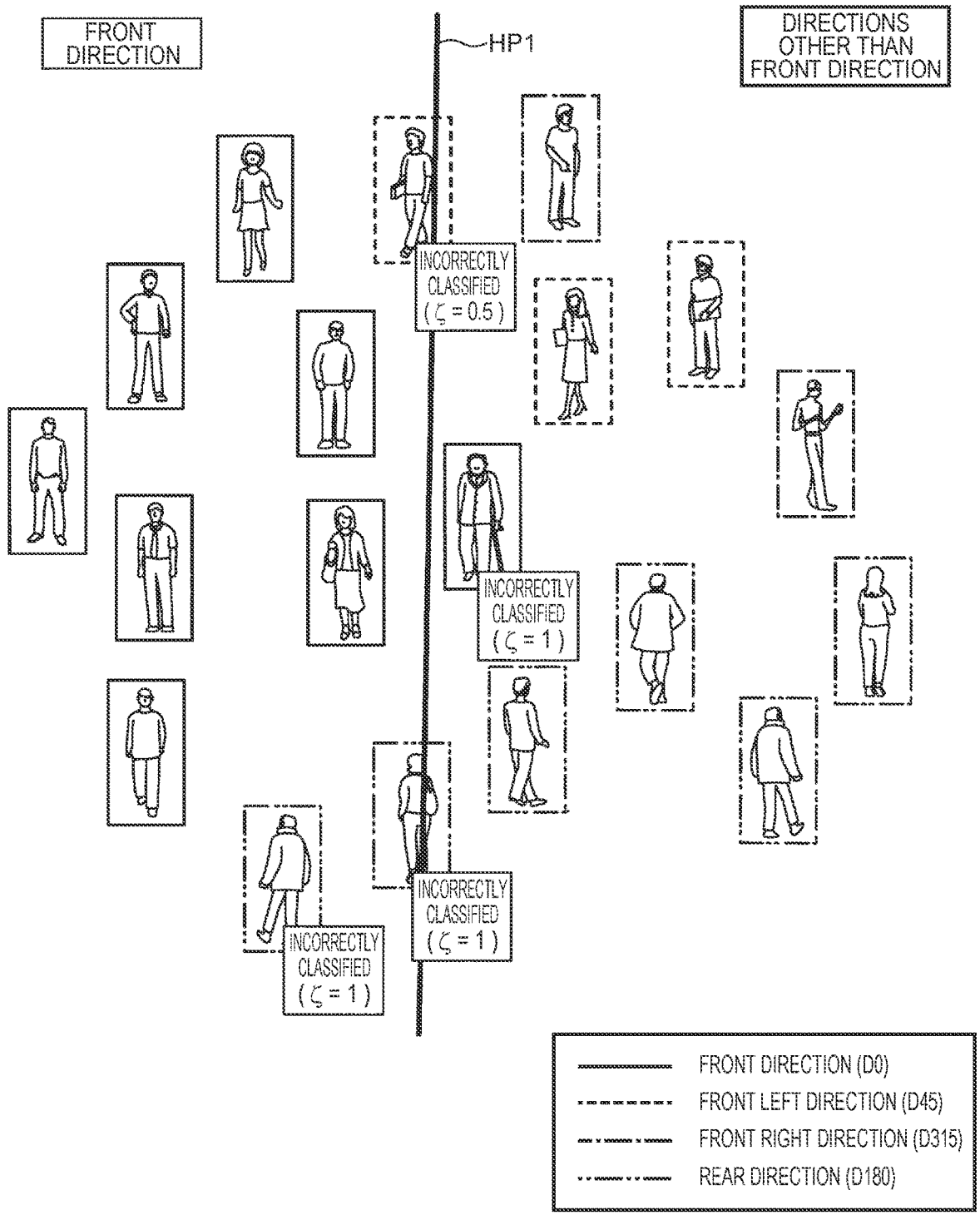
FIG. 10 is an explanatory view illustrating a function of the statistical learning method by the machine learning device according to the present embodiment.
Figure 11:
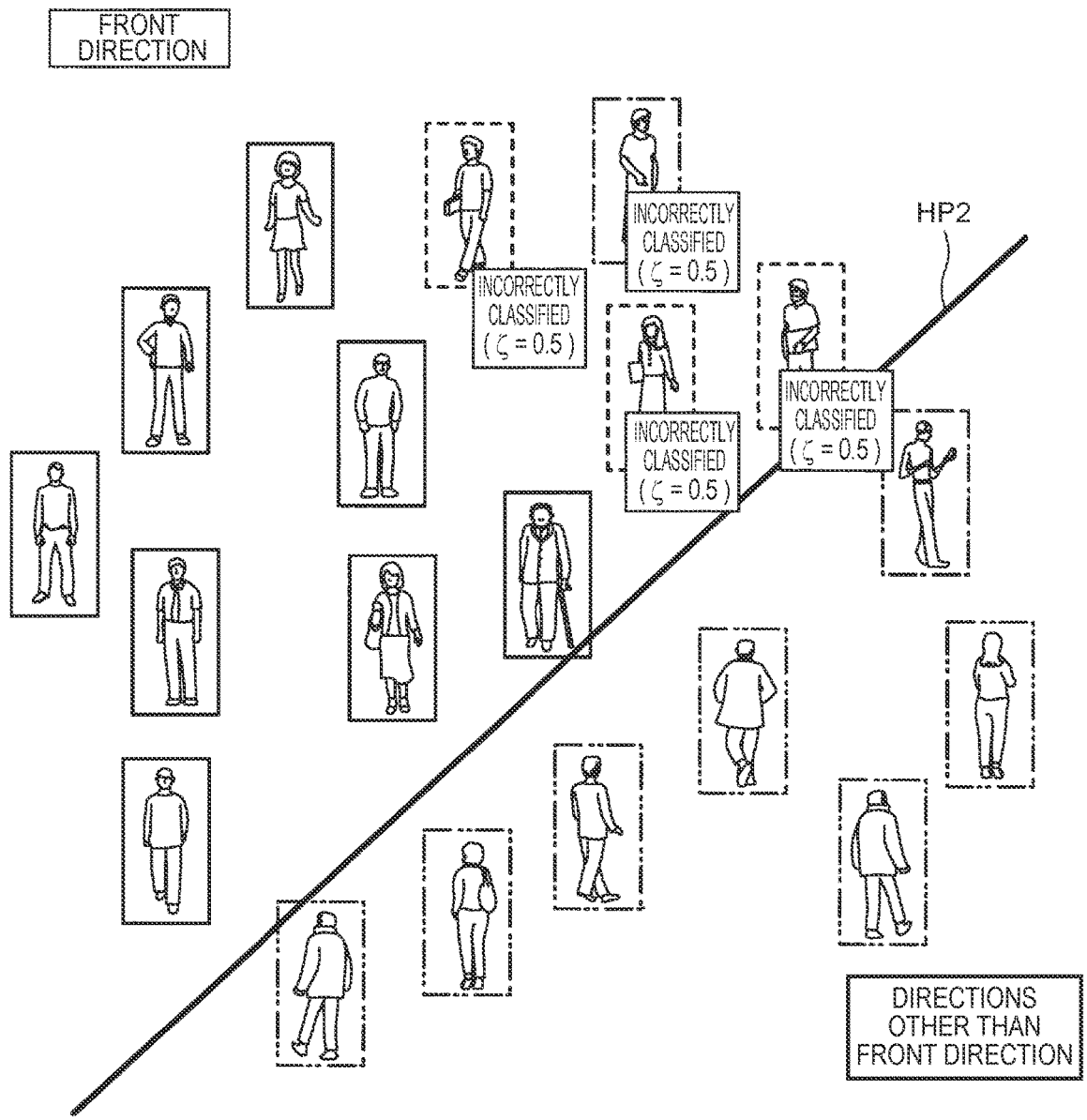
FIG. 11 is an explanatory view illustrating a function of the statistical learning method by the machine learning device according to the present embodiment.

FIGS. 10 and 11 are explanatory views illustrating function of the statistical learning method by the machine learning device 100 according to the present embodiment. Specifically, FIG. 10 is a simulative view illustrating one example of a separating hyperplane HP1 generated by a conventional statistical learning method (soft margin SVM which minimizes the number of misclassifications) according to a comparative example. FIG. 11 is a simulative view illustrating one example of a separating hyperplane HP2 generated by the statistical learning method (soft margin SVM which minimizes a sum total value of misclassification penalties ζ corresponding to a difference between a direction division corresponding to the correct direction and an incorrectly classified specific direction division) by the machine learning device 100 according to the present embodiment.

Arrangements of each learning image in FIGS. 10 and 11 simulate distributed arrangement states of each learning image on an input space SP in accordance with a difference between the HOG feature values of the respective rectangular portions. The separating hyperplanes HP1, HP2 separate the input space SP corresponding to a combination of the HOG feature values of the respective rectangular portions of the person image into a subregion corresponding to a front direction and a subregion corresponding to the directions other than the front direction.

As illustrated in FIG. 10, in the statistical learning method according to the comparative example, the separating hyperplane HP1 which minimizes the number of misclassifications is generated. In the comparative example, the number of misclassifications is minimized to four, though a rear-direction learning image D180 belonging to a direction division opposite to the front direction is included in the subregion corresponding to the front direction. Accordingly, when the separating hyperplane HP1 is used to discriminate whether or not the direction of a person is the front direction, there is a high possibility that the person whose direction is actually a rear direction is erroneously discriminated to be in the front direction which is largely different from the rear direction. In the comparative example, a front-direction learning image D0 is included in the subregion corresponding to the directions other than the front direction. Accordingly, when the separating hyperplane HP1 is used to discriminate whether or not the direction of a person is the front direction, there is a high possibility-that the person whose direction is actually the front direction is erroneously discriminated not to be in the front direction. As a result, the direction division of the person may erroneously be discriminated to another direction division (such as the rear-direction division opposite to the front direction division) largely different from the front-direction division.

As compared with the above comparative example, the present embodiment adopts, as illustrated in FIG. 11, a larger misclassification penalty ζ as a difference between a direction division corresponding to the correct direction and an incorrectly classified specific direction division becomes larger. Thus, the separating hyperplane HP2 which minimizes a sum total value of the misclassification penalties ζ is generated. Accordingly, the separating hyperplane HP2 is generated such that a direction division having a relatively large difference from the front-direction division, that is, a rear-direction learning image D180, for example, is not included in the subregion corresponding to the front direction in a stricter manner. Instead, the separating hyperplane HP2 is generated to permit misclassification to some extent, so that divisions having a relatively small difference from the front-direction division, that is, a front left-direction learning image D45 and a front right-direction learning image D315 in the direction divisions adjacent to the front-side direction in this example, are permitted to be erroneously included in the subregion corresponding to the front direction. In other words, the learning processing unit 160 searches for the separating hyperplanes (first to eighth separating hyperplanes) by putting more weight on the feature information (HOG feature value) of a rectangular portion, among the respective rectangular portions of a learning image, that is likely to have a difference in the feature between one direction division and another direction division largely different from the one direction division than on the feature information (HOG feature value) of a rectangular portion that is likely to have the difference in the feature between the one direction division and a direction division adjacent thereto. Accordingly, the class classifier 1 (the first class classifier 31 to the eighth class classifier 38) discriminates the direction of a person included in a person image by putting more weight on the feature information (HOG feature value), among the respective portions of the person image, that is likely to have a difference in the feature, such as a silhouette and a texture, between one direction division and another direction division largely different from the one direction division than on the feature information (HOG feature value) that is likely to have a difference in the feature between the one direction division and a direction division adjacent to the one direction division. Generally, among the respective rectangular portions of a person image, a portion which is likely to have a difference between one direction division and a direction division adjacent thereto is often different from a portion that is likely to have a difference between one direction division and another direction division largely different from the one direction division. That is, the portion that is likely to have a difference between one direction division and a direction division adjacent thereto is often the portion that is less likely to have a difference between one direction division and another direction division largely different from the one direction division. Therefore, the class classifier 1 can suppress erroneous discrimination in which the direction of a person is discriminated to be in a direction division largely different from the correct direction division (for example, a direction division opposite to the direction division corresponding to the correct direction).

When erroneous discrimination to a direction division adjacent to the one direction division occurs, generally a problem hardly arises in most of the cases. For example, as described later, in the case of determining whether or not a pedestrian notices the vehicle and whether or not the pedestrian tends to enter the roadway in accordance with the direction of the person (pedestrian), misclassification of the direction of the person to an adjacent direction division hardly affects the determination result.

When FIGS. 10 and 11 are compared, the number of misclassifications is 4 in both the cases. However, a sum of the misclassification penalties ζ corresponding to FIG. 10 is 3.5 (=1×3+0.5), whereas a sum of the misclassification penalties ζ corresponding to FIG. 11 is 2 (=0.5×4). As is clear from the above comparison, when the soft margin SVM is adopted to minimize a sum total value of the misclassification penalties ζ that increases more as a difference between the direction division corresponding to the correct direction and the incorrectly classified specific direction division becomes larger, it becomes possible to suppress erroneous discrimination in which the direction of a person in a person image is discriminated to be in a direction division (such as an opposite direction division) largely different from the correct direction.

A description is now given of an example of a vehicle on which the class classifier 1 according to the present embodiment is mounted.

Figure 12:
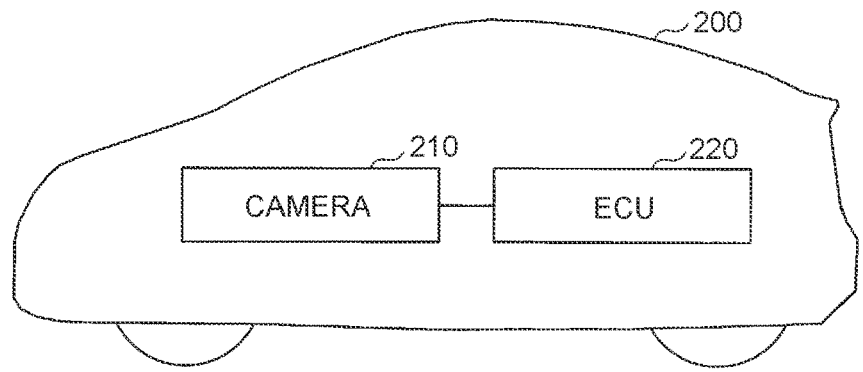
FIG. 12 is a block diagram illustrating one example of the configuration of a vehicle on which the class classifier according to the present embodiment is mounted.

FIG. 12 is a block diagram illustrating one example of the configuration of a vehicle 200 on which the class classifier 1 according to the present embodiment is mounted.

The vehicle 200 includes a camera 210 and an ECU 220.

The camera 210 is imaging means for imaging an area in front of the vehicle 200. For example, the camera 210 images the area in front of the vehicle 200 about every 1/30 seconds, and outputs the imaged image to the ECU 220.

The ECU 220 is an electronic control unit that performs control processing relating to driving assist for avoiding collision with an obstacle (a pedestrian in this example) ahead of the vehicle 200, based on an imaged image of the camera 210. The ECU 220 is mainly configured with a microcomputer including the CPU 2, the ROM 3, the RAM 4, and the interface unit 5 as illustrated in FIG. 1.

Figure 13:
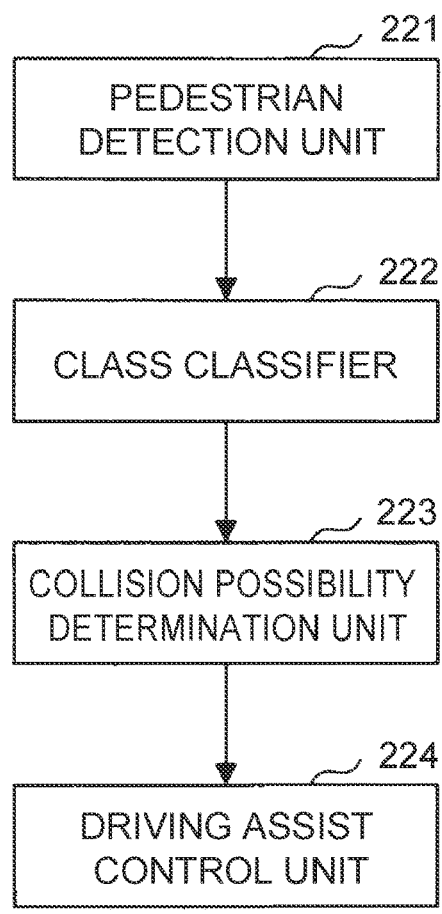
FIG. 13 is a functional block diagram of an ECU.

FIG. 13 is a functional block diagram of the ECU 220. The ECU 220 includes functional units implemented by executing one or more programs stored in the ROM 3 on the CPU 2 as illustrated in FIG. 1. The function units include a pedestrian detection unit 221, a class classifier 222, a collision possibility determination unit 223, and a driving assist control unit 224.

The pedestrian detection unit 221 detects a pedestrian from the imaged image input from the camera 210. Any given method may be used for detecting a pedestrian. For example, the pedestrian detection unit 221 may detect a pedestrian based on the trained model generated by the statistical learning method as in the case of the aforementioned class classifier 1. When a pedestrian is detected in the imaged image, the pedestrian detection unit 221 generates a person image including the pedestrian, and outputs the person image to the class classifier 222. When a pedestrian is detected in the imaged image, the pedestrian detection unit 221 also discriminates whether the detected pedestrian is in a roadway, on a left-side sidewalk, or in a right-side sidewalk. The pedestrian detection unit 221 outputs the discrimination result, i.e., the information about the location of the detected pedestrian, to the collision possibility determination unit 223.

The class classifier 222, which has the same functional configuration as the class classifier 1, discriminates the direction of the pedestrian in the person image input from the pedestrian detection unit 221. The class classifier 222 outputs the discrimination result to the collision possibility determination unit 223.

The collision possibility determination unit 223 determines a collision possibility with a pedestrian detected by the pedestrian detection unit 221, based on information such as the information about the location of the pedestrian input from the pedestrian detection unit 221, the direction of the pedestrian input from the class classifier 22, and a distance between the vehicle 200 and the pedestrian. The collision possibility determination unit 223 outputs the determination result about the collision possibility to the driving assist control unit 224.

For example, the collision possibility determination unit 223 may determine that the collision possibility is very high when a pedestrian is present in the roadway. In the case where a pedestrian is in a sidewalk and the pedestrian faces a roadway side (that is, in the case where the direction of the pedestrian in a left-side sidewalk is a right direction, a front right direction, or a rear right direction, or in the case where the direction of the pedestrian in a right-side roadway is a left direction, a front left direction, or a rear left direction), there is a possibility that the pedestrian may enter the roadway. Accordingly, the collision possibility determination unit 223 may determine that the collision possibility is relatively high. In the case where a pedestrian is in a sidewalk and the pedestrian stands with his or her back to the vehicle 200 (that is, in the case where the direction of a pedestrian is a rear direction, or the direction of the pedestrian in a left-side sidewalk is a rear right direction, or the direction of the pedestrian in a right-side sidewalk is a rear left direction), there is a possibility that the pedestrian does not notice the vehicle 200 and suddenly enters the roadway. Accordingly, the collision possibility determination unit 223 may determine that the collision possibility is at a middle level. In the case where a pedestrian is in a sidewalk and the pedestrian faces the front (that is, in the case where the direction of the pedestrian is a front direction), the pedestrian notices the vehicle 200, and therefore there is a low possibility that the pedestrian may suddenly enter the roadway. Accordingly, the collision possibility determination unit 223 may determines that the collision possibility is relatively low. In the case where a pedestrian is in a sidewalk and the pedestrian faces the opposite side of the roadway (that is, in the case where the direction of a pedestrian in a left-side sidewalk is a front left direction or a left direction, or in the case where the direction of the pedestrian in a right-side sidewalk is a front right direction or a right direction), there is a low possibility that the pedestrian may enter the roadway. Accordingly, the collision possibility determination unit 223 may determine that the collision possibility is relatively low.

The above-stated determination of the collision possibility is merely an example of the determination in consideration of only the location of the pedestrian and the direction of the pedestrian. The collision possibility determination unit 223 further takes into consideration the collision possibility based on a distance between the vehicle 200 and the pedestrian. For example, the distance between the vehicle 200 and the pedestrian may be calculated from the imaged image of the camera 210, or may be calculated based on a detection signal input from an unillustrated time off light (TOF) sensor (such as a laser radar and a millimeter wave radar) provided in the vehicle 200.

The driving assist control unit 224 performs driving assist control for avoiding the collision with a pedestrian based on the determination result about the collision possibility input from the collision possibility determination unit 223. For example, when the collision possibility determination unit 223 determines that the collision possibility is relatively high, the driving assist control unit 224 performs driving assist that informs (warns) the determined collision possibility to a driver of the vehicle 200. Specifically, the driving assist control unit 224 displays a warning on a display device (such as a meter unit) in a vehicle cabin, and provides a warning in voice. This makes it possible to warn the driver against sudden movement of a pedestrian to the roadway or the like. When the collision possibility determination unit 223 determines that the collision possibility is very high, the driving assist control unit 224 automatically executes control to generate braking force of the vehicle 200, restrict the driving force of the vehicle 200, or the like. Accordingly, since the vehicle 200 is decelerated regardless of the driver's operation, the collision with the pedestrian who, for example, entered the roadway can be avoided.

Here, when the direction of a pedestrian is erroneously discriminated in a direction largely different from an actual direction, or in a direction opposite to the actual direction in particular, the following inconveniences may occur. For example, when the direction of a pedestrian in front of the vehicle 200 is incorrectly classified into the direction opposite to a traveling direction of the vehicle 200 (the opposite direction of the vehicle 200) although an actual direction of the pedestrian is the same as the traveling direction of the vehicle 200 (that is, the pedestrian stands with his or her back to the vehicle), the collision possibility with the pedestrian may incorrectly be determined to be low even though the pedestrian is unaware of the vehicle. If the direction of a pedestrian in front of the vehicle 200 is erroneously discriminated to be the direction away from a roadway even though an actual direction of the pedestrian is the direction of entering the roadway, the collision possibility may be erroneously determined to be low even though the possibility of the pedestrian entering the roadway is high.

On the other hand, the class classifier 222 (i.e., class classifier 1) according to the present embodiment can suppress the erroneous discrimination in which the direction of a pedestrian is discriminated to be in a direction division largely separated from the correct direction (for example, a direction division opposite to the direction division corresponding to the correct direction) as described in the foregoing. Accordingly, the driving assist control unit 224 can perform more appropriate driving assist for avoiding collision with the pedestrian.

Although the class classifier 1 (direction discrimination device) is mounted on the vehicle 200 in the example described in the present embodiment, the class classifier 1 may be configured to discriminate the direction of a person outside the vehicle 200, and the discrimination result may be transmitted to the vehicle 200. For example, the class classifier 1 may be mounted on a center server which can bidirectionally communicate with the vehicle 200. The center server may receive images imaged with cameras disposed in roadsides or cameras mounted on other vehicles 200, and the class classifier 1 may discriminate the direction of a pedestrian included in the images. In this case, the center server transmits the discrimination result to the vehicle 200 traveling in the vicinity of the location where the images are imaged. As a result, the vehicle 200 (driving assist control unit 224) can perform driving assist that avoids collision with the pedestrian based on the discrimination result.

Although the mode for carrying out the present disclosure has been described in detail, the present disclosure is not limited to such specific embodiment. Various modifications and changes may be made without departing from the scope of the present disclosure.

For example, in the embodiment disclosed, the class classifier 1 discriminates the direction of a person based on the statistical learning method. However, the direction of a person may be discriminated based on a predefined rule (that is, discrimination conditions with respect to the feature information of each rectangular portion of a person image). In this case, the class classifier 1 may discriminate the direction of a person included in a person image by putting, as a predefined rule, more weight on the feature information (HOG feature value), among the respective rectangular portions of the person image, that is likely to have a difference in the feature, such as a silhouette and a texture, between one direction division and another direction division largely different from the one direction than on the feature information (HOG feature value) that is less likely to have the difference in the feature between the one direction division and the other direction. Therefore, it becomes possible to suppress erroneous discrimination in which the direction of the person is discriminated to be in a direction division largely different from the correct direction division (for example, a direction division opposite to the direction division corresponding to the correct direction) as in the embodiment disclosed.

What is claimed is:

1. A direction discrimination device, comprising:
   a camera; and
   an electronic control unit configured to:
   receive a captured image from the camera;
   extract pieces of feature information from an image of a person in the captured image, each of the pieces of feature information representing a feature of corresponding one of a plurality of prescribed portions of the person; and
   discriminate a direction of the person based on the extracted pieces of feature information and weight first feature information more than second feature information in determination of the direction of the person, the first feature information and the second feature information being among the pieces of feature information, the first feature information being feature information of a portion that is likely to have a difference in the feature between a first direction and a second direction range, the second feature information being feature information of a portion that is less likely to have a difference in the feature between the first direction and the second direction range, the second direction range not including the first direction and including a second direction opposite to the first direction.

2. The direction discrimination device according to claim 1, wherein
   the electronic control unit is configured to discriminate whether the direction of the person is included in a first direction range including the first direction or included in a direction range including the second direction range and not including the first direction range, based on a size relation between a value of a specified function having the feature information of each of the plurality of prescribed portions as independent variables and a specified value.

3. The direction discrimination device according to claim 2, wherein
   the electronic control unit is configured to weight the first feature information by multiplying an independent variable, among the independent variables, corresponding to the first feature information by a larger value while multiplying an independent variable corresponding to the second feature information by a smaller value.

4. The direction discrimination device according to claim 1, wherein
   the electronic control unit is configured to:
   cut a range including the person out of the captured image to create the image of the person; and
   divide the image of the person into a specified number of regions such that each of the regions includes a corresponding one of the plurality of prescribed portions.

5. The direction discrimination device according to claim 2, wherein
   the specified function and the specified value are additional values to be added, in a case where it is discriminated whether directions of persons included in a plurality of learning images are included in the first direction range or included in a direction range other than the first direction range respectively, when at least one of following (i) and (ii) is satisfied;
   (i) a direction of a person in a learning image among the plurality of learning images, not included in the first direction range is erroneously discriminated to be included in the first direction range,
   (ii) when the direction of the person in the learning image, among the plurality of learning images, included in the first direction range is erroneously discriminated to be included in the direction range other than the first direction range, and wherein
   the additional values become larger as a difference in the direction between the direction of the person in the learning image not included in the first direction range and the first direction range is larger, and
   the additional values is determined such that a sum of the additional values is minimized.

6. The direction discrimination device according to claim 5, wherein
   the first direction range includes a direction in which the person in the learning image among the plurality of learning images, faces an imaging device capturing the learning images.

7. The direction discrimination device according to claim 5, wherein
   the specified function is expressed by a following expression using an independent variable $x_i$ representing N pieces of the feature information (N≥2) extracted from each of the plurality of prescribed portions, and constants $\phi_i$, $a_i$, and b (i=1, 2, . . . , N)

$$f(x_i) = \sum_{i=1}^{N} (x_i)^{\phi_i} \times a_i + b$$

where the $a_i$ and the b are determined such that the sum of the additional values is minimized.

8. The direction discrimination device according to claim 7, wherein
   the $\phi_i$ is 1.

9. A direction discrimination method, comprising:
   receiving, by an electronic control unit, a captured image from a camera;
   extracting pieces of feature information by the electronic control unit, each of the pieces of feature information representing corresponding one of features of a plurality of predefined portions of a person in the captured image; and discriminating a direction of the person based on the pieces of feature information by the electronic control unit, the electronic control unit weighing, in the discriminating, first feature information more than second feature information, the first feature information and the second feature information being among the pieces of feature information, the first feature information being feature information of a portion that is likely to have a difference in the feature between a first direction and a second direction range, the second feature information being feature information of a portion that is less likely to have a difference in the feature between the first direction and the second direction range, the second direction range not including the first direction and including a second direction opposite to the first direction.

* * * * *

UNITED STATES PATENT AND TRADEMARK OFFICE
CERTIFICATE OF CORRECTION

PATENT NO. : 10,699,106 B2  
APPLICATION NO. : 15/665725  
DATED : June 30, 2020  
INVENTOR(S) : Yasutomo Kawanishi et al.

Page 1 of 1

It is certified that error appears in the above-identified patent and that said Letters Patent is hereby corrected as shown below:

On the Title Page

Item (72), Inventor 1, city, delete "Nagoya" and insert --Nagoya-shi Aichi-ken--, therefor.

Item (72), Inventor 2, city, delete "Nagoya" and insert --Nagoya-shi Aichi-ken--, therefor.

Item (72), Inventor 3, city, delete "Nagoya" and insert --Nagoya-shi Aichi-ken--, therefor.

Item (72), Inventor 4, city, delete "Nagoya" and insert --Nagoya-shi Aichi-ken--, therefor.

Item (72), Inventor 5, city, delete "Nagoya" and insert --Nagoya-shi Aichi-ken--, therefor.

Signed and Sealed this  
Thirteenth Day of October, 2020

Andrei Iancu  
*Director of the United States Patent and Trademark Office*